United States Patent
Mylly et al.

(10) Patent No.: US 7,739,487 B2
(45) Date of Patent: Jun. 15, 2010

(54) METHOD FOR BOOTING A HOST DEVICE FROM AN MMC/SD DEVICE, A HOST DEVICE BOOTABLE FROM AN MMC/SD DEVICE AND AN MMC/SD DEVICE METHOD A HOST DEVICE MAY BOOTED FROM

(75) Inventors: Kimmo Mylly, Julkujarvi (FI); Marko Ahvenainen, Ruutana (FI)

(73) Assignee: Nokia Corporation, Espoo (FI)

( * ) Notice: Subject to any disclaimer, the term of this patent is extended or adjusted under 35 U.S.C. 154(b) by 1017 days.

(21) Appl. No.: 11/333,799

(22) Filed: Jan. 17, 2006

(65) Prior Publication Data
US 2007/0168652 A1 Jul. 19, 2007

(51) Int. Cl.
*G06F 13/00* (2006.01)

(52) U.S. Cl. ............................. 713/1; 713/2; 710/301; 710/315; 710/316; 711/115; 235/492

(58) Field of Classification Search ................ 713/1, 713/2; 710/307, 315, 316; 711/115; 235/492
See application file for complete search history.

(56) References Cited

U.S. PATENT DOCUMENTS

| | | | | |
|---|---|---|---|---|
| 7,342,611 | B2 * | 3/2008 | Larner et al. | 348/372 |
| 7,457,907 | B2 * | 11/2008 | Takahashi et al. | 711/103 |
| 2002/0069308 | A1 * | 6/2002 | Jones et al. | 710/5 |

(Continued)

FOREIGN PATENT DOCUMENTS

| | | |
|---|---|---|
| EP | 1132824 | 9/2001 |
| EP | 1152411 | 11/2001 |
| WO | WO 2005088254 | 9/2005 |

OTHER PUBLICATIONS

The MultiMediaCard, System summary, MultiMediaCard Association, 2005. Retrieved from the Internet Jun. 27, 2007. http://www.mmca.org/compliance/buy_spec/MMCA_System_SummaryV41.pdf.
Samsung MultiMediaCard, Product Datasheet, Samsung Electronics, 2005. Retrieved from the Internet Jun. 27, 2007. http://www.samsung.com/Products/Semiconductor/FlashCard/MMC/HighSpeedMMC/FullSize_MMCplus/MC4GH02GNMCA/ds_HS_MMC_rev03.pdf.
Written Opinion and International Search Report dated Jul. 3, 2007 from parallel International Application No. PCT/IB2006/003371, 14 pages.

(Continued)

*Primary Examiner*—Abdelmoniem Elamin
(74) *Attorney, Agent, or Firm*—Hollingsworth & Funk, LLC

(57) ABSTRACT

Systems and methods for booting a host device(s) from a peripheral device(s), via an interface, such as an MMC/SD interface, with power terminals, a data bus with data bus terminals, a clock line with a clock terminal and a command line with command terminal. Power is provided to the power terminals, and the command terminal of the MMC/SD or analogous interface is set during power-up to low. The data bus is monitored for a start bit of data transmission.

53 Claims, 3 Drawing Sheets

MMC/SD interface

U.S. PATENT DOCUMENTS

| | | | |
|---|---|---|---|
| 2004/0230789 A1* | 11/2004 | Lee | 713/2 |
| 2004/0236997 A1 | 11/2004 | Poo | |
| 2005/0021933 A1 | 1/2005 | Wang et al. | |
| 2005/0039471 A1 | 2/2005 | Smith et al. | |
| 2005/0132116 A1* | 6/2005 | Gillet | 710/307 |
| 2005/0132137 A1* | 6/2005 | Toombs et al. | 711/115 |
| 2006/0001909 A1* | 1/2006 | Kawaura | 358/1.16 |

OTHER PUBLICATIONS

Singapore Search Report dated Jul. 3, 2009 from parallel Singapore Application No. SG200805122-9, 1 page.

Russian Office Action dated Dec. 15, 2009 from parallel Russian Application No. 2008129129/09, 12 pages.

* cited by examiner

METHOD FOR BOOTING A HOST DEVICE FROM AN MMC/SD DEVICE, A HOST DEVICE BOOTABLE FROM AN MMC/SD DEVICE AND AN MMC/SD DEVICE METHOD A HOST DEVICE MAY BOOTED FROM

FIELD OF THE INVENTION

The present invention relates to a memory device and especially to the interfaces of memory cards. More specifically the present invention relates to Multi Media Cards (MMC) or Secure Digital (SD-) cards. There is a trend that embedded mass memories are started to be introduced with formerly known memory card electrical interfaces. That is, it is desirable to be able to use memory card similar to mass memories. Up to now the development and improvement of such interfaces has concentrated on removable memory cards. There are some unresolved problems that need to be taken care of so that the interface suits better also for embedded memories.

The invention introduces a booting mechanism also to a formerly known serial protocol memory card interface (MMC IF). The method can be based on same signal state (as in prior art) or can utilize the already existing serial protocol of the memory card interface.

BACKGROUND OF THE INVENTION

A short specification of the MMC-specification may be downloaded from the Internet site "http://www.mmca.org/compliance/buy_spec/MMCA_System_SummaryV41.pdf".

Boot definitions for existing embedded mass memory components having a different electrical interface are already known. These known components are e.g. NAND, OneNAND and MDOC mass memories. Common to all of these is that they are using some signal state (e.g. separate pin reserved for booting) during certain stage of power up to indicate to the memory component that it should fetch the first sector (typically 512 B) of data to the IO buffers. The technical data sheet of M-systems DiskOnChip (DOC) being cited as state of the art may be retrieved from the Internet at the address http://www.m-systems.com/NR/rdonlyres/85A96312-0130-47AD-A22C-CB533E28EE7A/0/DOC_G3__512Mb__1Gb_Rev20.pdf.

There are other known boot definitions for the other existing embedded mass memory components which has different electrical interface. These kinds of components are e.g. NAND (see: http://www.samsung.com/Products/Semiconductor/NANDFlash/index.htm), OneNAND (see: http://www.samsung.com/Products/Semiconductor/OneNAND/index.htm) and MDOC (see: http://www.m-systems.com/site/en-US/Products/DiskOnChip/DiskOnChip/) mass memories. Common to all of these is that they are using some signal state (e.g. separate pin reserved for booting) during certain stage of power up to indicate to the memory component that it should fetch the first sector (typically 512 B) of data to the IO buffers.

Present MMC- and SD-memory cards can provide capabilities of performing e.g. hot-swap operations, but it is also desirable to extend the capabilities of these memory cards to be able to provide a broader functionality.

To improve the usability of memory cards it would be desirable to enable a user to use memory cards as bootable media. This feature would enable a broader use of e.g. MMC (Multi-Media Card) and SD (Secure Digital) cards not only in self booting devices such as mobile cellular phones or cameras but also as a bootable storage medium for e.g. laptop and palmtop computers.

Presently, in the field of MMC-cards and SD-cards, the only way to access the first (sector) data during boot up of a host device is to follow the whole procedure of initializing the card, reading/writing the registers and performing a normal read access to known address.

The issue with existing MMC- and SD memory card interface protocols is that there is no efficient booting mechanism defined. The only way to access the first (sector) data during boot up of a host device is to follow the whole procedure of initializing the card, reading/writing the registers and performing a normal read access to known address. That means it is actually impossible to perform a boot procedure with a device not being configured to perform automatically a normal read access to a boot address (as e.g. the address of the boot data to be read is not known).

It is also desirable to achieve a broader usability without a necessity to change the electrical interface or the form factor, i.e. without using the signal state of an additional separate pin reserved for booting during certain stage of power up to indicate to the memory component that it should fetch a certain sector of data to the I/O buffers.

Therefore, a problem addressed by the invention involves extending the capabilities of existing MMC- and SD-cards without changing to many properties of the memory cards and to also be able to guarantee full down-compatibility.

SUMMARY OF THE INVENTION

According to one aspect of the present invention a booting mechanism is introduced to a formerly known serial protocol memory card interface of the MMC IF used in MMC cards/devices and SD-cards/devices. The method can be based on same signal state (as in prior art) or can utilize the already existing serial protocol of the memory card interface.

According to a first aspect of the present invention a method for booting a host device from a peripheral device, via an MMC/SD interface is provided. The MMC/SD interface comprises power terminals, a data bus with data bus terminals, a clock (CLK) line with a clock (CLK) terminal and a command (CMD) line with a command (CMD) terminal. In accordance with the present invention the method comprises providing power (and ground) to said power terminals, and setting the CMD terminal of said MMC/SD interface (of the host device) during power-up to a low (signal state), followed by monitoring the data bus for a start bit of a data transmission.

In the standard power-up procedure of a MMC SD/card or device, the host device sets the CMD terminal of said MMC/SD interface during power-up to high. That is, this embodiment utilizes an existing signal to indicate the boot during power up. However it is an "unexpected" signal in the interface which is used by the host device that it intends to perform a boot procedure. Presently it is not defined in the MMC/SD specification what happens if the CMD line is set to low during a power up procedure of a SD/MMC card or device.

The CMD terminal of said MMC/SD interface of the host device may be set to a "low" signal state during the period; conventionally the "CMD0" command is sent via the CMD line. The "CMD0" command is a command of the power up procedure, the GO_IDLE_STATE (CMD0). The next command of used during initialization is the CMD1 command the SEND_OP_COND (send operation conditions) to identify an operation voltage range of a peripheral device having an MMD/SD interface. Other commands of the initialization procedure are the CMD 2 and CMD 3 commands, wherein CMD2 (ALL_SEND_CID) request the unique card identification number (CID) and command CMD3 (SET_RELA- TIVE_ADDR) sets a relative card address (RCA), which is shorter than CID the CID to speed up the data exchange.

In an example embodiment of the present invention the method further comprises sending a clock signal from said host device to said clock terminal of said MMC/SD interface, wherein said CMD terminal of said MMC/SD interface is set to low before or during power up process during the transmission of between 24 to 148, preferably between 60 and 100 and most preferably of the or at least the first 74 initialization clock cycles.

In another example embodiment of the present invention said method further comprises sending a clock signal from said host device to said clock terminal as long as the card has sent the data via said data bus, e.g., the host device keeps clocking until the all data the card has to send are transmitted.

In yet another example embodiment of the method of the present invention the host device sets the data bus terminals to low, to indicate a width for the data bus to be used for the data transfer. In this embodiment the host device can signal the peripheral device having an MMC/SD interface the number of data lines/terminals to be used for the data transmission of the boot data by the MMC/SD device such as a MMC/SD-card. In the present specification the expression MMC/SD device is selected to refer to MMC/SD memory cards as well as to embedded devices such as embedded memory devices having a MMC/SD interface.

It is for example envisaged to set only the first data bus terminal (Dat0) to low to indicate the peripheral device having an MMC/SD interface that only this terminal (single channel multiplex) is to be used for transferring boot data to the host device.

That is, the respective number of data bus lines to be used for transferring the boot data to the host device is pulled to low along with indicating the boot request with CMD line low.

With these implementations it there is no more need to fully initialize the component and set the registers in prior to first read access for requesting, e.g., boot data.

According to another aspect of the present invention a method is provided for booting from a peripheral device having an MMC/SD interface. Basically this aspect relates to the peripheral device side of the booting procedure. The peripheral device comprises an MMC/SD interface with power terminals, a data bus with data bus terminals, a clock line with a clock terminal and a CMD line with CMD terminal. The method of this aspect of the invention comprises receiving power (and ground) at said power terminals of said MMC/SD-interface, receiving a low signal (state) at the CMD terminal before or during power up, and sending the first data of a predefined storage area via data bus, starting with a start bit of the first data frame.

During power up the peripheral device having an MMC/SD interface detects the "unexpected" signal stat at the command line and starts the transmission of boot data from a predetermined data file, a predetermined storage/memory area or defined "boot data sector" of the memory module/core of the peripheral device having an MMC/SD interface. The combination of the above described method for booting a host device and the method for booting from a peripheral device having an MMC/SD interface complete each other to a boot process. It has been envisaged to draft also system claims comprising e.g. all steps of both involved devices (e.g., Host and peripheral device having an MMC/SD interface).

In an example embodiment said first data of a pre-defined storage area via data bus, are only send if and when the peripheral device receives a low signal at said CMD terminal of said MMC/SD-interface during power-up process during the transmission of between 24 to 148, preferably between 60 and 100 and most preferably of the or at least the first 74 initialization clock cycles. It is also envisaged to select a pre-defined file instead of a pre-defined storage area for the transfer of boot data.

In an example embodiment of the method of the present invention Said method further comprises receiving a low signal at the data bus terminals, indicative of a width of the data bus to be used for the data transfer, and sending said data using the indicated data bus width.

If, e.g., first two data bus data bus terminals (Dat0 and Dat1) are determined to be set to "low" (signal state), the peripheral device having an MMC/SD interface uses only these two terminals (two channel multiplex) for transferring boot data to the host device.

That is, the respective number of data bus lines to be used for transferring the boot data to the host device are "pulled to low" along with the CMD line low (indicative of a boot request).

According to another aspect of the present invention a method for booting a host device from a peripheral device having an MMC/SD interface is provided. The host device has an MMC/SD interface with power terminals, a data bus with data bus terminals, a clock line with a clock terminal and a CMD line with CMD terminal. The method comprises sending during an initialization procedure an argument for a boot request from said host device via said MMC/SD-interface to said peripheral device, said boot request comprising a command, sending a clock (CLK) signal to the clock (CLK) line, and monitoring the terminals of the data bus for a start bit of a data transmission (and the data itself also).

This implementation is based on the utilization of existing serial protocol command. That is, an "unexpected" signal protocol command is sent to the interface to indicate that the host device intends to perform a boot procedure (with data from the peripheral device having an MMC/SD interface). This may be for example implemented by sending an argument for a boot request comprising a reset command from the host via the MMC/SD interface to the peripheral device, followed by monitoring the data bus terminals for a start bit of a data transmission/data frame. The argument for the boot request is sent during the initialization procedure e.g. during or directly after the CMD0 phase (e.g., the initialization of a peripheral device having an MMC/SD interface after the power up of the card). It is also envisaged to send the inside boot request inside a command frame (e.g., inside a CMD0 command, as defined in the MMC/SD specification).

This may be implemented by amending e.g., the argument for CMD0, which is currently 0X00000000. When the value of 0X00000001 is used as the first argument sent to the MMC/SD interface this could indicate a boot request.

In an example embodiment of the present invention, the method further comprises sending additional arguments indicating parameters related to the boot sequence selected from the group of number of data lines to be used for the boot sector read, and clock frequency/timing mode to be used, et cetera, along with argument for the boot request from said host device to the MMC/SD-interface. The argument for the data bus width may be transferred inside the command frame (e.g., inside a command frame of CMD0) e.g., in addition to the boot request.

This embodiment enables the host device to define additional parameters for other arguments related to boot sequence/the booting procedure in the (or in connection with the) boot request or the boot data transfer procedure.

As already described in the other aspects of the invention the bus width to be used for the transmission of boot data may also be indicated by a number of data bus terminals that may be set to low (before, during or subsequently to the transmission of the boot request argument). It is also possible to utilize the number of data bus terminals set to a "low" signal state as an indication of the number of data bus terminals to be used for transmission.

When using a binary coded counting algorithm for the Dat0 to Dat7 terminals, it would be sufficient to use only 4 e.g. Dat0 to Dat3 to define the terminals for determining all possible numbers of terminals that may be sued for transferring the boot sequence. When using a binary counting algorithm to define $2^N$ data terminals to be used for transmission of it is sufficient to use only three Dat terminals to define the 8 (and up to 64 (not yet defined Dat terminals, when N is defined e.g. as (binary coded number −1) as other wise the Dat terminals for a single line transmission would be coded as all terminals set to "high" which in turn could not at all be interpreted as a bus width (as the standard signal during boot procedure is all data terminals set to "high"). It may also be envisaged to utilize just one of the Dat lines/terminals set during the initialization procedure to "low" as an indication for a boot request (while or while not the others code the bus-width the frequency or other parameter).

(An artisan should be aware that in the present implementation a low signal condition is to be interpreted as a binary "0" or a binary "1" in accordance with the respective positive or negative counting scheme, and that it is not necessary to explicitly denote that it does not matter if the binary number is counted from Dat0 to Dat3 or coded only in the even or the odd terminals or from top to bottom (Dat 7 to Dat4) etc.)

This implementation leaves 4 to 5 Dat terminals free, which in turn may be used to code additional boot period parameters such as number of data lines to be used for the boot sector read, and clock frequency/timing mode to be used, et cetera . . .

This implementation of data bus signal during start up may be implemented in all above and following implementations the method or device of the present invention.

According to yet another aspect of the invention the above boot data provision procedure for a peripheral device having an MMC/SD interface is provided. The method is for booting a host device from a peripheral device, with an MMC/SD interface with power terminals, a data bus with data bus terminals, a clock line with a clock terminal and a CMD line with CMD terminal. The method comprises receiving during an initialization procedure of the peripheral device having an MMC/SD interface an argument for a boot request from said host device at said MMC/SD-interface of the peripheral device, receiving a clock signal at the data bus, and sending data starting with a start bit of a data transmission to said host device via said MMC/SD-interface, if and when boot data are stored in the peripheral device.

This implementation represents the utilization of e.g. an existing serial protocol (and maybe also and reset command), as an "unexpected" signal protocol command (which is received instead of the usually expected CMD0 command) which is received at the interface is construed by the peripheral device (controller) as a request for a transmission of boot data. As already disclosed in the host side procedures said argument for a boot request may for example comprise a reset command at said MMC/SD-interface (which may be included in an amended CMD0 command indicative of a boot request). After card receives e.g. the reset command CMD0 with the argument it would fetch the first data to IO buffers, and start sending stored or retrieved boot data to the data bus (at least as long a clock signal is received at the clock terminal).

In an example embodiment of the present invention the method further comprises receiving additional arguments indicating parameters related to the boot sequence selected from the group of number of data lines to be used for the boot sector read, and clock frequency/timing mode to be used for a data transmission, along with said argument for the boot request from said host device, and using said indicated parameters for transmitting data via said data bus to said host device. This may be implemented directly in the boot request or may be indicated by a respective signal input/state detected at the Dat0 to Dat7 terminals.

According to another aspect of the present invention a method for booting a host device from a peripheral device having an MMC/SD interface is provided. The method comprises starting a standard initialization data exchange of a peripheral device having an MMC/SD interface until a stand-by-state of the peripheral device having an MMC/SD interface is reached, and subsequently performing a data exchange between said host device and said peripheral device from said stand-by-state to search for valid boot in the components in the data bus.

In the boot request argument could also be given in the later phase of the initialization sequence with or after the CMD0, CMD1, CMD2, CMD3 commands (of the normal initialization until card is entering stand-by-state). After the peripheral device having an MMC/SD interface reached the stand-by-state the host may go through one by one the components in bus to search for a valid boot code.

This aspect utilizes a conventional initialization process of a peripheral device having an MMC/SD interface before the host device starts an application to search actively for boot data. This implementation requires that the host device is capable of performing the whole initialization process and a search/load routine for Boot data stored on the peripheral device having an MMC/SD interface even in an un-booted condition. That is the device required at least a hard-coded algorithm for the initialization of the peripheral device having an MMC/SD interface and an algorithm for boot data search/load.

This implementation has the most significant advantage that it may be performed with a respectively modified host device and completely conventional peripheral device having an MMC/SD interfaces.

According to another aspect of the present invention a method for booting a host device from a peripheral device having an MMC/SD interface is provided. The host device is connected to the peripheral device via an MMC/SD-interface having a data bus and a CMD terminal. Additionally, said peripheral device is provided with an additional argument for a boot request in an Operation Condition Register of said peripheral device having an MMC/SD interface. In this aspect of the present invention said method comprises performing a standard initialization process of the peripheral device having an MMC/SD interface, and after terminating said initialization process, sending an argument for a boot request to said MMC/SD-interface, and monitoring the data bus for boot data to be received from the peripheral device via said MMC/SD-interface.

This embodiment of the present invention may be performed during "CMD 1" (or higher following CMD numbers) phase of the initialization process of the peripheral device having an MMC/SD interface. That is, the transfer of booting data may be initiated following to the initial step(s) of the peripheral device initialization. As in the above case, this method requires a change at the Operation Condition Register and therefore the peripheral device having an MMC/SD interface itself. Which in turn entails that it may not be possible to update existing (host devices or) peripheral devices having an MMC/SD interface to be able to perform this transfer of boot data.

As in the above cases of the present invention the above method also comprises a pendant on the peripheral device side. In this embodiment of the present invention a method for booting a host device from a peripheral device having an MMC/SD interface is provided. As in the above case said peripheral device is provided with an MMC/SD-interface having a data bus and a CMD terminal. The peripheral device having an MMC/SD interface is also provided with an additional argument for a boot request in an Operation Condition Register of said peripheral device. This embodiment of the present invention comprises performing an initialization process of the peripheral device having an MMC/SD interface, and after terminating said initialization process; receiving an argument for a boot request at the peripheral device; and retrieving and sending boot data from a memory module if said peripheral device via said MMC/SD-interface to said host device.

According to another aspect of the present invention, a computer program product downloadable from a server for carrying out the method of the preceding description of booting a host device from a peripheral device having an MMC/SD interface is provided. The computer program comprises program code means for performing all of the steps of the preceding methods when said program is run on a host device, a peripheral device having an MMC/SD interface or a system of host device with an inserted peripheral device having an MMC/SD interface.

According to yet another aspect of the invention, a computer program product is provided comprising program code means stored on a computer readable medium for carrying out the methods of the preceding description which is capable to boot a host device from a peripheral device having an MMC/SD interface, when said program product is run on a host device, a peripheral device having an MMC/SD interface or a system of host device with an inserted peripheral device having an MMC/SD interface.

According to another aspect of the present invention a computer data signal is provided. The computer data signal is embodied in a carrier wave and represents a program that makes the computer perform the steps of the method of booting a host device from a peripheral device having an MMC/SD interface of the preceding description, when said computer program is run on a host device, a peripheral device having an MMC/SD interface or a system of host device with an inserted peripheral device having an MMC/SD interface.

Preferably the computer program/the computer program product are distributed in different parts of the system of host device and peripheral device having an MMC/SD interface e.g. one part of the computer program is located in an executed in the host device and one computer program is locate in an executed in a peripheral device having an MMC/SD interface. Therefore, the computer program and the computer program device have to be different in abilities and source code.

According to yet another aspect of the present invention a bootable host device configured for being booted from a peripheral device having an MMC/SD interface is provided. The host device comprises an internal or external power supply, a processor connected to said power supply, and an MMC/SD-interface connected to said processor and to said power supply. The MMC/SD interface comprises power terminals, a data bus with data bus terminals, a clock line with a clock terminal and a CMD line with CMD terminal. The host device is configured for providing power to the terminals of said MMC/SD-interface, setting the CMD terminal of said MMC/SD-interface during power-up to low (signal state), and monitoring the data bus for a start bit of a data transmission.

Basically this aspect of the invention relates to a host device that is capable of performing the boot procedure disclosed in the preceding part of the specification. The processor may be provided with a main memory and may be have the necessity of performing a boot procedure.

Basically, the device puts out an unexpected signal state at the command terminal of the MMC/SD interface. The command line/terminal of the MMC/SD interface may be set low (instead of currently pulled up) to indicate the boot request during initialization. That is, a principle of the present invention resides in that a (known or new) signal is used during the initialization procedure as an "unexpected" input to signalize that a host device actually requests boot data.

In an example embodiment of the bootable host device said processor is configured to send a clock signal from said host device to said data bus terminals of said MMC/SD-interface and to set the CMD terminal of said MMC/SD-interface during power-up process to low while transmitting between 24 and 148, preferably between 60 and 100 and most preferably 74 initialization clock cycles. In this embodiment the host device uses a different "unexpected signal" to indicate a boot data request. This embodiment requires that the respective peripheral device having an MMC/SD interface is capable of identifying a clock signal at the clock terminal during power-up/initialization process. It is also envisage to use the number of clock signals sent to the MMC/SD interface as a parameter for coding e.g. a width of a data bus to be used of a frequency to be used for boot data transfer.

In another example embodiment of the host device of the present invention said processor is further configured to send a clock signal from said host device to said data bus terminals of said MMC/SD-interface as long as the card starts to send the first data via said data bus. That is the host is configured to keep clocking the clock terminal until the start of a data transmission can be detected by the host from the reception of the start bit of the first data frame or until all boot data are transferred to the host device.

In yet another example embodiment of the present invention said processor is configured to set the data bus terminals to low, to indicate a width for the data bus to be used for the transfer by a peripheral device having an MMC/SD interface inserted in said MMC/SD-interface. This may be implemented by a processor being configured to set the terminals Dat0 to Dat7 to low that should be used for the transfer of boot data. It may also be envisaged to implement an inverted approach to set all Dat0-7 terminals to be used for boot data transfer to high to indicate an 8-bit bus-width to be user. (In this case the MMC/SD-interface would be set to an 8-bit default boot data transfer.) (It is also envisaged to use a host device or a peripheral device having an MMC/SD interface configured to use one of the coding schemes indicated in the method section of the present specification.)

According to another aspect of the present invention a peripheral device having an MMC/SD interface is provided, which is configured for booting a bootable host device (which is in turn configured for being booted from a peripheral device having an MMC/SD interface). According to the invention, said peripheral device comprises an MMC/SD-interface, an peripheral device controller, connected to said MMC/SD-interface, and a memory module, connected to said peripheral device controller. As defined in the MMC/SD specification the MMC/SD-interface is provided with power terminals, a data bus with data bus terminals, a clock line with a clock terminal and a CMD line with CMD terminal. The peripheral device having an MMC/SD interface is characterized in that said peripheral device controller is configured for sending the first data of a predefined storage area via a data bus, starting with a start bit of the first data frame, when receiving power at the terminals of said MMC/SD-interface of a peripheral device, and a low signal a the CMD terminal of said MMC/SD-interface during power-up. In the peripheral device having an MMC/SD interface said peripheral device controller is connected to said MMC/SD-interface and to said memory module.

It is also envisaged that the device (controller) is configured to automatically select a pre-defined file in the memory module for the transfer of boot data. It should be clear that the powering-up process also includes the provision/detection of power at the power terminals as well s the provision of ground to the ground terminals (as part of the power supply terminals of the MMC/SD-interface).

In an example embodiment of the present invention said peripheral device having an MMC/SD interface (controller) is further configured to send said first data of a predefined storage area via data bus, only when receiving a low signal at said CMD terminal of said MMC/SD-interface before or during power up process during the transmission of between 24 to 148, preferably between 60 and 100 and most preferably to 74 initialization clock cycles.

In this embodiment the MC/SD card has to capable of counting the number of clock cycles to received during the initialization procedure to identify a received/indicated boot request from a host device (which requires an accordingly amended design of the peripheral device having an MMC/SD interface).

In another example embodiment of the present invention said peripheral device controller is further configured to receive a low signal at the data bus terminals of said MMC/SD-interface, indicating a width for the data bus to be used for the transfer by, and sending said data using the indicated data bus width. This embodiment is considered as being directed to a MMC card capable of recognizing during the startup procedure the signal states at the Dat terminals (0-2, 0-3 or 0-7) to derive from this signal a bus-width to be used for the transfer of BOOT signals. It is also envisaged to configure the peripheral device having an MMC/SD interface in a way that it is capable of recognizing bus-width data that are e.g. binary coded.

That is, the peripheral device having an MMC/SD interface of this embodiment aspect of the invention is capable checking and recognizing during the power-up procedure the signal state of the CMD signal line and eventually in more sophisticated embodiments also the signal state (or number of pulses) of the CLK and bus lines to recognize a boot request. (See e.g. the part of the specification related to method of the present invention.)

According to another aspect of the present invention a bootable host device configured for being booted from a peripheral device having an MMC/SD interface. The host device comprises (as all other above cited host devices a power supply, a processor connected to said power supply, and an MMC/SD-interface connected to said processor and to said power supply, said MMC/SD-interface having power terminals, a data bus with data bus terminals, a clock line with a clock terminal and a CMD line with CMD terminal.

This host device is configured for sending during an initialization process of the peripheral device having an MMC/SD interface an argument for a boot request from said host device via said MMC/SD-interface to the peripheral device, and monitoring the data bus for a start bit of a data transmission.

Said argument for a boot request may for example comprise for example a reset command at said MMC/SD-interface sent for example during the CMD0 phase (i.e. the initialization of a peripheral device having an MMC/SD interface directly after providing the power terminals of the card with a recommended voltage).

In an example embodiment of the present invention said host device is configured for sending additional arguments via said MMC/SD-interface, said additional arguments indicating parameters related to the boot sequence such as number of data lines to be used for the boot sector read, clock frequency/timing mode to be used, etc. These additional arguments/parameters are sent along with said argument for the boot request from said host device to said MMC/SD-interface.

In another example embodiment of the present invention said host device is further configured, to set the data bus terminals of said MMC/SD-interface to low, for indicating a width for the data bus to be used for the transfer. This embodies a host device capable of sending bus information via the data terminals of the data bus to the peripheral device having an MMC/SD interface for configuring the boot data transfer. Examples for a number of possibilities to indicate/signalize these parameters are given in the description of the method of the present invention. It is expected the host device may not be booted from a conventional peripheral device having an MMC/SD interface.

According to yet another aspect of the present invention a peripheral device having an MMC/SD interface is provided, which is configured for booting a bootable host device (which is in turn configured for being booted from a peripheral device having an MMC/SD interface). According to the present invention the peripheral device comprises an MMC/SD-interface, comprising power terminals, a data bus with data bus terminals, a clock line with a clock terminal and a CMD line with CMD terminal, an peripheral device controller, connected to said MMC/SD-interface, and a memory module, connected to said peripheral device controller. Further according to the invention said peripheral device having an MMC/SD interface being configured for sending data starting with a start bit of a data transmission via said MMC/SD-interface to said host device, in case boot data are stored in the peripheral device, if and when receiving an argument for a boot request from said host device at said MMC/SD-interface of the peripheral device, and when receiving a clock signal at the clock line.

It is for example envisaged that the peripheral device having an MMC/SD interface recognizes an argument for a boot request if the boot request comprises e.g. a reset command (as defined in the MMC/SD-interface specification).

In an example embodiment of the present invention said peripheral device controller is further configured to receive a low signal at the data bus terminals of said MMC/SD-interface terminal indicating a width for the data bus to be used for the transfer and wherein said peripheral device controller is further configured for using said indicated data bus width for the data bus to be used for the transfer. Examples of how the bus width may be coded to an 8 bit argument of the data terminals/lines Dat0 to Dat7 of a MMC/SD-interface are disclosed in the above description of the method of the present invention.

In another example embodiment of the present invention said peripheral device controller is further configured to receive along with argument for the boot request from said host device, additional arguments indicating parameters related to the boot sequence such as number of data lines to be used for the boot sector read, frequency/timing mode to be used, and/or clock other parameters. The peripheral device having an MMC/SD interface (controller) of this embodiment is further configured to send said (requested boot) data via said data bus to said host device according to said parameters indicated in said received argument.

It may also be noted that all above implementations of boot devices have the primary design target to shorten the access time to boot data with respect to a more or less conventional approach of completely initializing the MMC/SD interface and subsequently searching for boot data stored on said peripheral device having an MMC/SD interface.

(It should be noted that the term "MMC/SD interface" is used to denote either a MMC interface alone or a combined MMC/SD interface ore even a SD interface alone, as not all MMC interfaces also support the SD form factor).

As in the case of the dashboard of cars MMC designers seem to have implemented an "all high" input in the initializing procedure of MMC/SD-interface, presumable to be able to check if one of the terminals has a failure or is faulty. This is the only case in which the method of the present invention may produce wrong results, in case the low signal states are caused by an electronic defect.

According to still another aspect of the present invention a bootable host device is provided, which is configured for being booted from a peripheral device having an MMC/SD interface. This host device comprises a power supply, a processor connected to said power supply, and an MMC/SD-interface connected to said processor and to said power supply, said MMC/SD-interface having power terminals, a data bus with data bus terminals, a clock line with a clock terminal and a CMD line with CMD terminal. The host device of this aspect of the invention is configured for starting a standard initialization data exchange of a peripheral device via said MMC/SD-interface until a stand-by-state of the peripheral device having an MMC/SD interface is reached, and performing a data exchange between said host device and said peripheral device from said stand-by-state for searching for a valid boot code in the components in bus.

Said processor may be provided with a (bootable) main memory. (This host device is configured not to send a "boot request argument" at all, as the host device may be capable of searching autonomously for data files that may be recognized as boot files/data.) That is, the boot request is given in the later phase of the initialization sequence with or after the CMD0, CMD1, CMD2, CMD3 commands (of the normal initialization until the card has entered a stand-by-state). After the peripheral device having an MMC/SD interface reached the stand-by-state the host may go through one by one the components in bus to search for a valid boot code.

This host device may use a conventional initialization of a peripheral device having an MMC/SD interface before the host device starts an application to search actively for boot data. This implementation of a peripheral device having an MMC/SD interface requires that the host device is capable of performing the whole initialization process and a search/load routine for Boot data stored on the peripheral device even in an un-booted condition. This may be construed as kind of BIOS capability, enabling the device to operate the MMC/SD-interface to initialize a peripheral device and subsequently search for boot data. This may be implemented by e.g. least a hard-coded algorithm for the initialization of the peripheral device having an MMC/SD interface and an algorithm for boot data search/load.

This implementation has a significant advantage in that it may be performed with a respectively modified host device and completely conventional peripheral devices having an MMC/SD interface. However, the fact that the user may have access to the may include that the user may unintentionally use the wrong peripheral device having an MMC/SD interface in the slot (i.e. interface). Thus this implementation is especially useful for applications in which it is clear that the device will not function without the peripheral device having an MMC/SD interface such as e.g. gaming devices (such as the N-gage gaming console) or in which the MMC/SD cars is used as internal firmware storage (i.e. the user has no access to the card and may not get frustrated trying to operate the device with a peripheral device having an MMC/SD interface without any boot data).

According to just another aspect of the present invention a bootable host device configured for being booted from a peripheral device having an MMC/SD interface, wherein said peripheral device is provided with an Operation Condition Register (OCR) with an additional argument for a boot request. As in the other above embodiments of host devices, said host device comprises a power supply, a processor connected to said power supply, and an MMC/SD-interface connected to said processor and to said power supply, said MMC/SD-interface having power terminals, a data bus with data bus terminals, a clock line with a clock terminal and a CMD line with CMD terminal. In accordance with the present invention the host device is configured for sending after initialization of a peripheral device having an MMC/SD interface an argument for a boot request to said MMC/SD-interface, and monitoring the data bus for boot data to be received from the peripheral device via said MMC/SD-interface.

That is the host device may sent after the sending after initialization of a peripheral device having an MMC/SD interface an argument for a boot request to said MMC/SD-interface, and monitoring the data bus for boot data to be received from the peripheral device via said MMC/SD-interface. This may happen e.g. during or after a "CMD1" data exchange phase/period. In contrast to the above version of a host device there is dedicated request provided for/in the peripheral device for transferring boot data. That is, in this embodiment the boot procedure for the host device just comprises the initialization process, the transmission of the boot data request and the reception of boot data. In this implementation the peripheral device having an MMC/SD interface is aware if boot data are present and at which location they are stored at. Even though an artisan readily recognizes this fact it is explicitly stated that the host device is actually aware of (i.e. has stored) the argument for a boot request of the Operation Condition Register of the peripheral devices having an MMC/SD interface.

This implementation of the present invention requires a new definition of register information to be defined in CMD1 level, and an additional argument in the OCR register to indicate if the component is embedded/including boot code. Thereby the host could request the boot data while sending the CMD1 (argument allocated for CMD1 command).

According to still an additionally aspect of the present invention a peripheral device having an MMC/SD interface is provided. This peripheral device is configured for booting a bootable host device configured for being booted from a peripheral device having an MMC/SD interface. This peripheral device having an MMC/SD interface is provided in the Operation Condition Register with an additional argument for a boot request. The peripheral device comprises an MMC/SD-interface, comprising power terminals, a data bus with data bus terminals, a clock line with a clock terminal and a CMD line with CMD terminal, an peripheral device controller with an Operation Condition Register, connected to said MMC/SD-interface, and a memory module, connected to said peripheral device controller.

This peripheral device having an MMC/SD interface is provided in the Operation Condition Register with an additional argument for a boot request. This peripheral device having an MMC/SD interface (or its controller) is configured for receiving after an initialization procedure of a peripheral device having an MMC/SD interface an argument for a boot request at the peripheral device, and retrieving (said requested boot data from the memory module) and sending said boot data from the peripheral device memory module via said MMC/SD-interface to said host device. Thereby the peripheral device enables the host device to request boot data by sending a single boot data transfer request. However the Operation Condition Register of the MMC/SD has to be changed, which includes intrinsically the fact that conventional peripheral devices having an MMC/SD interface actually on the market may not be upgraded with this extra feature.

In an example embodiment of the of the present invention said Operation Condition Register with said argument for a boot request is implemented in the peripheral device having an MMC/SD interface as a hard-coded hardware component, connected to or implemented in said peripheral device controller.

In this Hardware solution a component which would include boot capability would only reply with its OCR and after CMD1 handshake would have been finalized (ready state) the host could just continue clocking the bus to again receive the first data in data line. However this implementation requires difference hardware between boot/non-boot components. Anyhow, without the reception of a boot request, even a boot process enabled peripheral device having an MMC/SD interface may be used as a non boot peripheral device having an MMC/SD interface.

In another example embodiment of the present invention said Operation Condition Register with said argument for a boot request is implemented as software running in a peripheral device controller. This embodiment represents a Firmware (software) solution wherein all the components in the bus would reply with their OCR until they are ready and only the last reply would include valid indication about the boot capability. This implementation is more complex due to fact that if there are more than one component in the same bus and the boot capable component gets ready earlier than the non boot capable then the boot capability needs to be verified later in the initialization sequence again (e.g. by reading the OCR register separately again).

It should be noted that the memory card of the memory card controller may further be provided with additional sub-elements known from the MMC/SD-interface specification such a power-on detection module, a memory core a memory interface a interface memory card interface controller and other components.

BRIEF DESCRIPTION OF THE DRAWINGS

In the following, the invention will be described in detail by referring to the enclosed drawings in which.

DETAILED DESCRIPTION OF EMBODIMENTS OF THE INVENTION

In the detailed description which follows, identical components have been given the same reference signs, regardless of whether they are shown in different embodiments of the present invention. In order to clearly and concisely illustrate the present invention, the drawings may not necessarily be to scale and certain features may be shown in somewhat schematic form.

Figure 1:
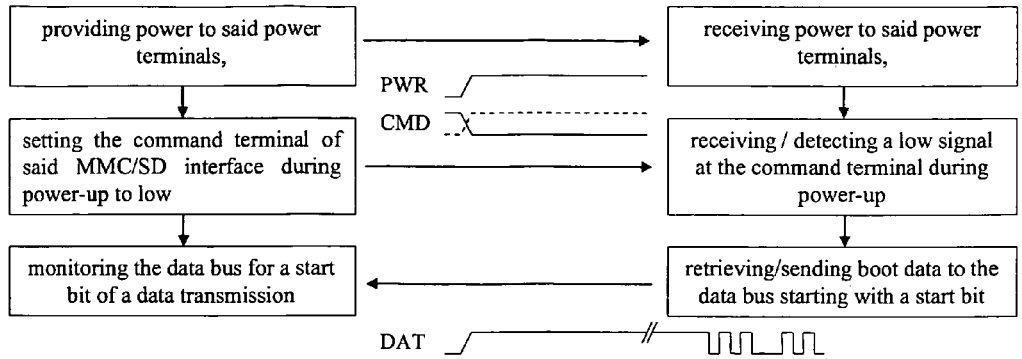
FIG. 1 is a flowchart visualizing both parts of the method according to one aspect of the present invention.
Figure 2:
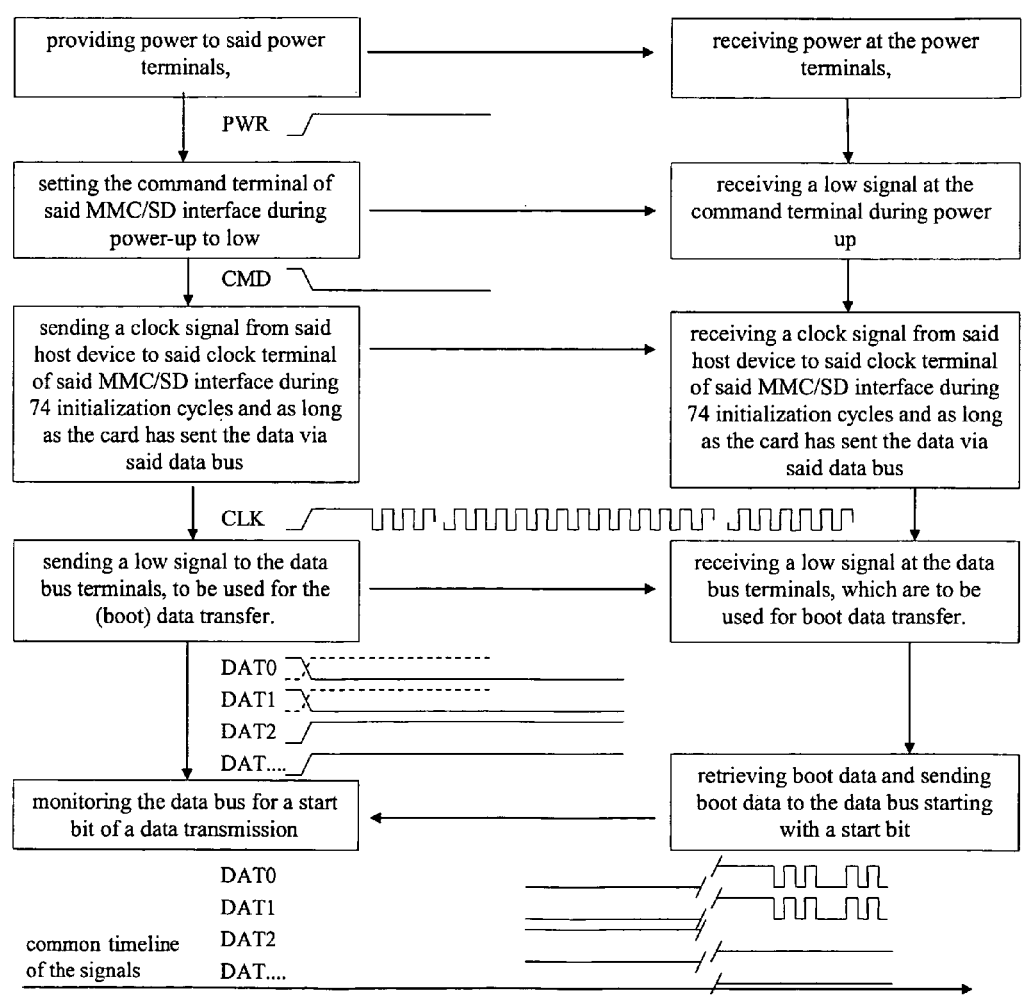
FIG. 2 depicts an alternative embodiment of the method of FIG. 1.
Figure 3:
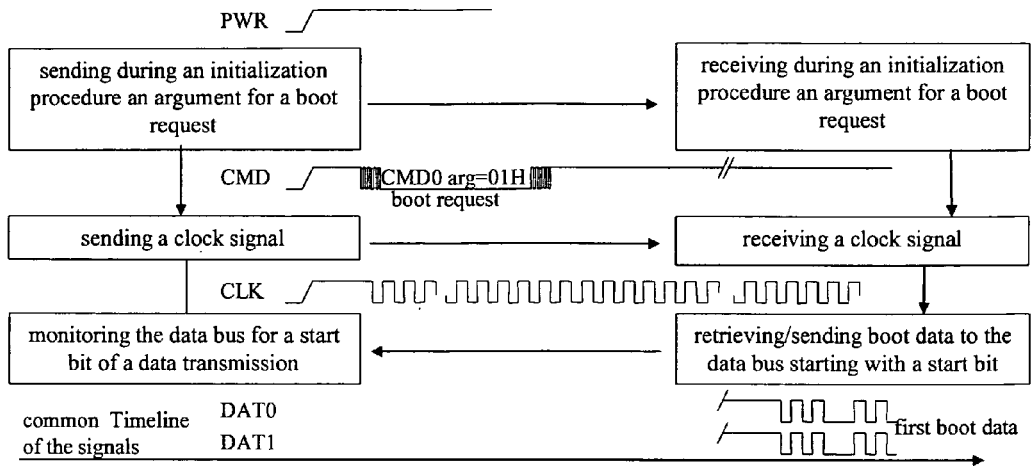
FIG. 3 depicts another embodiment of a booting procedure according to the present invention.
Figure 4:
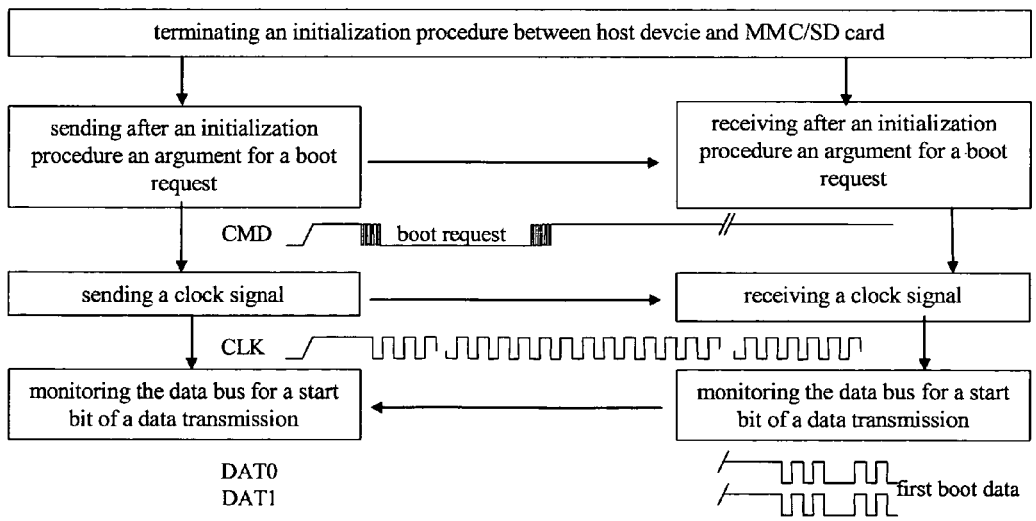
FIG. 4 depicts another implementation of the present invention, wherein a boot request is transmitted after the peripheral device having an MMC/SD interface has been completely initialized, FIG. 5 depict a host device and a peripheral device having an MMC/SD interface connected via a MMC/SD interface, and FIG. 6 depict a host device and a peripheral device having an MMC/SD interface each provided with a dedicated boot unit connected via a MMC/SD interface.

In FIG. 1 and the following FIGS. 2, 3 and 4 the host device part of the flowchart is depicted at the left side while the part of the flowchart depicted on the right side refers to actions or processes performed by or in the peripheral device having a MMC/SD interface.

To further illustrate the methods of the present invention some selected signals such as power (PWR), Data (DAT) sometimes even split up into the single data signals (Dat0, . . . Dat1, . . . ), the clock (CLK) signal and the command signal are indicated in a conventional left to right manner. To better indicate low signal states, low signals are depicted as a transition from high to low.

The conventional signalization is indicated (when possible) in interrupted lines.

FIG. 1 is a flowchart visualizing both parts of the method according to one aspect of the present invention. In the flowchart the host device from a peripheral device, that is connected via an MMC/SD to a MMC/SD cars. The flowchart starts in the top left corner wherein the host device powers the peripheral device having an MMC/SD interface by providing power to the power terminals of the MMC/SD cars interface. Thus, the peripheral device receive a power signal (Top right).

Simultaneously (or subsequently) the host device put a "low" signal to the command line (CMD). The peripheral device having an MMC/SD interface receiving this signal (while expecting according to the present MMC/SD/interface specification) a high signal state (and later a CMD0 command) detects an (according to the present MMC/SD-interface initialization specification) "unexpected" signal. The MMC/SD card (according to the present invention) is configures to recognize this low signal state and interprets it as boot request. Following the detected boot request the peripheral device having an MMC/SD interface simply retrieves boot data (e.g. from a dedicated file or memory area) and sends via the interface to the host device (as indicated by the DAT signal).

Accordingly the host device monitors the data terminals of the interface for the reception of boot signals. When receiving data, the host device may load them into a main memory of the host device to actually terminate the boot request.

To indicate the conventional signal state at the command line (all time high until the transmission of the CMD0, CMD1, and CMD 2, . . . signals of the conventional initialization process) an interrupted line is depicted in FIG. 1.

FIG. 2 depicts an alternative embodiment of the method of FIG. 1. In addition to what is disclosed in FIG. 1. FIG. 2 starts with the same steps as FIG. 1.

Additionally to the low signal provided at the CMD terminal, the host device provides a clock signal at the clock terminal (for at least 74 cycles or until all boot data have been transferred).

By providing this additional signal the peripheral device having an MMC/SD interface may clearly distinguish between and e.g. a command terminal failure and boot request consisting of two different signal components.

In an additional step the host device sets two the Dat0 and Dat1 terminals of the data bus to low, thereby indicating a width of the data bus to be used for a subsequent the data transfer. (Conventionally the bus terminals are set to "high" as indicated by the interrupted lines.) The "low signals" are received at the card and are interpreted accordingly, and therefore only Dat0 and Dat1 terminals are depicted sending signals in the last step, while Dat2 and Dat . . . terminals are not used for the boot data transfer.

With this implementation a host device may start a download of boot data with the first steps upon the connection of a peripheral device having an MMC/SD interface, thereby speeding up the boot process significantly.

FIG. 3 depicts similarly a booting procedure. In contrast to the implementation of FIG. 2 an amended CMD0 is used to indicate a boot request to the peripheral device having an MMC/SD interface. Conventionally an initialization procedure would comprise a CMD command with an argument 00H. The depicted implementation of the method of the present invention uses an (according to the conventional specification) "unexpected" CMD0 signal having the argument 01H. By the reception of the amended CMD0 signal the MMC card can recognize an incoming boot request even before the peripheral device having an MMC/SD interface reached an initialized state.

The amended CMD0 command may be sent alone or (as in FIG. 2) in connection with a clock signal.

Also other parameters could be transferred within the command argument along with the boot request. These kind of additional parameters could be e.g. used bus width and used timing mode (separate bits/values would be needed to be allocated)

FIG. 4 depicts another implementation of the present invention, wherein a boot request is transmitted after the peripheral device having an MMC/SD interface has been completely initialized, i.e. raced a "stand-by state". In the stand by the host device sends a boot request command to the peripheral device having an MMC/SD interface via the command line (and starts clocking the clock terminal of the MMC/SD-interface). This implementation requires it that a respective boot request command is defined in the protocol of the MMC/SD interface (i.e. in the Operation Condition Register of the peripheral device having a MMC/SD interface). (It is also envisaged that the host device autonomously searches the memory module of the peripheral device having an MMC/SD interface for a certain data structure recognizable as boot data, e.g. marked with a filename such as "**.bot".) When receiving the boot request, the peripheral device having an MMC/SD interface may automatically define the desired boot data and may initiate the data transfer.

Figure 5:
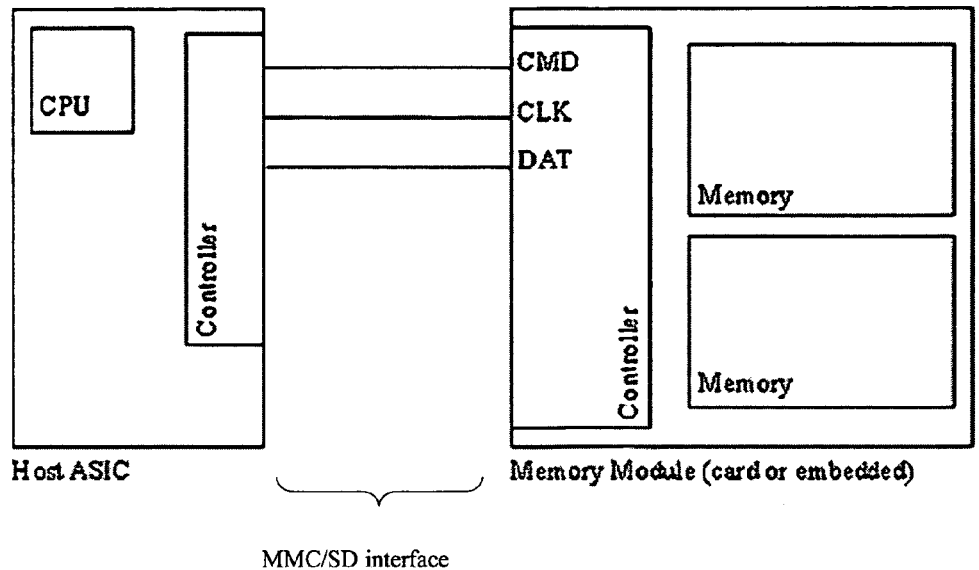
Figure 6:
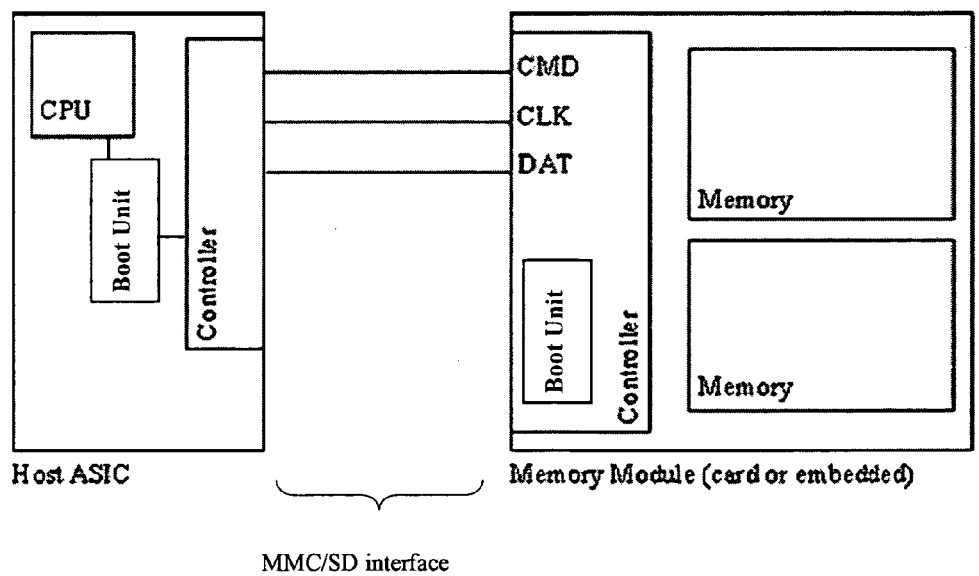

FIG. 5 depict a host device and a peripheral device having an MMC/SD interface connected via a MMC/SD interface. The host device comprises a processing unit (CPU) and a MMC/SD interface controller. To avoid obscuring the figure on the CMD CLK and DAT terminals of the MMC/SD interface are depicted. The MMC/SD memory card comprises a peripheral device controller serving as a mediator between the interface and the memory module and serves to control all procedures to be performed between MMC/SD interface and memory module.

In the implementations of the present invention the host interface controller is configured to perform (e.g. send the signals required to execute) the method of the present invention.

Therefore the host device (or the host interface controller) may be provided with a dedicated boot module implemented as software in the host device.

In the implementations of the present invention the interface controller of the peripheral device having an MMC/SD interface is configured to perform (e.g. send the signals required to execute) the method of the present invention.

Similarly the MMC/SD interface controller is be provided with a dedicated boot module implemented as software. The software boot module enables the peripheral device controller to be able to determine if a signal indicating a boot request is received and if boot data are to be sent to the host device.

FIG. 5 depicts the host device and a peripheral device having an MMC/SD interface of FIG. 5 each provided with a dedicated boot module or boot unit.

In the implementations of the present invention the boot unit/boot module connected to the host interface controller is configured to perform (e.g. send the signals required to execute) the method of the present invention. The host device (or the host interface controller) is provided with a dedicated boot module implemented as a hardware implementation in the host device. Such a boot module has to be connected to the CPU to be able to determine if a boot procedure is to be performed or not. Additionally the boot module or boot unit has also to be connected to the (MMC/SD) interface (or the controller) to be able to take all the steps necessary to induce (or perform) the boot procedure (i.e. to send all necessary signals). The boot unit may be implemented as a circuit connected in parallel to the interface controller between the interface itself and the CPU.

Said boot module may comprise components to set the command terminal of said MMC/SD interface during power-up to low, send a clock signal from said host device to said clock terminal of said MMC/SD interface as long as the card has sent the data via said data bus, set the data bus terminals to low, to indicate a width for the data bus to be used for the data transfer, and/or may further comprise components configured to send during an initialization procedure an argument for a boot request to the MMC/SD-interface, send a clock signal to the clock line, and/or further comprises components configured to send after initialization of a peripheral device having an MMC/SD interface an argument for a boot request to said MMC/SD-interface, and monitor the data bus for start bit of boot data to be received from the peripheral device via said MMC/SD-interface.

In another example embodiment of said peripheral device said Operation Condition Register with said argument for a boot request is implemented as software running in peripheral device controller.

In the implementations of the present invention the MMC/SD-interface controller is configured to perform (e.g. send the signals required to execute) the method of the present invention by using a dedicated boot module or boot unit.

Similarly the MMC/SD (memory card or the) interface controller is be provided with a dedicated boot module implemented as software of hardware implementation in the MMC/SD memory device. Such a boot module has to be connected to the peripheral device controller (or at least to the interface) to be able to determine if a signal indicating a boot request is received and if boot data are to be sent to the host device. The boot module may also be connected to a dedicated boot sector defined on the memory module of the peripheral device to simplify the boot process.

Said boot module may comprise components to sending the first data of a predefined storage area via data bus, starting with a start bit of the first data frame after receiving a low signal a the command terminal-before or during power up.

It is also envisaged that the boot unit or the boot module comprises dedicated components receive clock signals as an additional parameter indicating a boot request and may further be provided with a component to send said data using a bus-width indicated by a low signal received at data bus terminals.

The boot unit may also be provided with a dedicated Operation Condition Register with an additional argument for a boot request provided in said peripheral device having an MMC/SD interface In yet another example embodiment of the present invention said Operation Condition Register with said argument for a boot request is implemented as software running in peripheral device controller.

The use of the present invention enables much more efficient boot with memory card interface embedded memories wherein the utilization of existing pins/protocol to minimize HW/FW changes This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

What is claimed is:

1. A method for booting a host device from a peripheral device, via an MMC/SD interface with power terminals, a data bus with data bus terminals, a clock line with a clock terminal and a command line with command terminal, said method comprising:
   providing power to said power terminals,
   setting the command terminal of said MMC/SD interface during power-up to low, and
   monitoring the data bus for a start bit of a data transmission.

2. A method according to claim 1, said method further comprising sending a clock signal from said host device to said clock terminal of said MMC/SD interface, wherein said command terminal of said MMC/SD interface is set to low before or during power-up process during the transmission of between 24 to 148, preferably between 60 and 100 and most preferably to 74 initialization clock cycles.

3. A method according to claim 1, said method further comprising sending a clock signal from said host device to said clock terminal as long as the device has sent the data via said data bus.

4. A method according to claim 1, wherein said data bus terminals, said method further comprising setting the data bus terminals to low, to indicate a width for the data bus to be used for the data transfer.

5. A computer readable medium encoded with a computer program comprising program code sections for carrying out the method of claim 1, when said program is run on a host device, a peripheral device having an MMC/SD-interface or a system of host device with an inserted peripheral device having an MMC/SD-interface.

6. A method for booting from a peripheral device having an MMC/SD-interface, via said MMC/SD interface with power terminals, a data bus with data bus terminals, a clock line with a clock terminal and a command line with command terminal, said method comprising:
   receiving power at said power terminals of said MMC/SD-interface,
   receiving a low signal at the command terminal before or during power up, and
   sending the first data of a predefined storage area via data bus, starting with a start bit of the first data frame.

7. A method according to claim 6, wherein said first data of a predefined storage area via data bus, are only send if and when receiving a low signal at said command terminal of said MMC/SD-interface during power-up process during the transmission of between 24 to 148, preferably between 60 and 100 and most preferably to 74 initialization clock cycles.

8. A method according to claim 6, further comprising:
   receiving a low signal at the data bus terminals, indicating a width for the data bus to be used for the transfer by, and
   sending said data using the indicated data bus width.

9. A computer readable medium encoded with a computer program comprising program code sections for carrying out the method of claim 6, when said program is run on a host device, a peripheral device having an MMC/SD-interface or a system of host device with an inserted peripheral device having an MMC/SD-interface.

10. A method for booting a host device from a peripheral device having an MMC/SD-interface with power terminals, a data bus with data bus terminals, a clock line with a clock terminal and a command line with command terminal, said method comprising:
    sending during an initialization procedure an argument for a boot request from said host device via said MMC/SD-interface to the peripheral device,
    sending a clock signal to the clock line, and
    monitoring the data bus for a start bit of a data transmission.

11. A computer readable medium encoded with a computer program comprising program code sections for carrying out the method of claim 10, when said program is run on a host device, a peripheral device having an MMC/SD-interface or a system of host device with an inserted peripheral device having an MMC/SD-interface.

12. A method according to claim 10, further comprising:
    sending additional arguments indicating parameters related to the boot sequence selected from the group of number of data lines to be used for the boot sector read, and
    clock frequency/timing mode to be used,
along with argument for the boot request from said host device to the MMC/SD-interface.

13. A method for booting a host device from a peripheral device having an MMC/SD-interface with power terminals, a data bus with data bus terminals, a clock line with a clock terminal and a command line with command terminal, said method comprising:
    receiving during an initialization procedure of the peripheral device an argument for a boot request from said host device at said MMC/SD-interface of the peripheral device,
    receiving a clock signal at the clock terminal, and
    sending data starting with a start bit of a data transmission to said host device via said MMC/SD-interface, if and when boot data are stored in said peripheral device.

14. A method according to claim 13, further comprising receiving additional arguments indicating parameters related to the boot sequence selected from the group of
- number of data lines to be used for the boot sector read, and
- clock frequency/timing mode to be used for a data transmission, along with said argument for the boot request from said host device, and using said indicated parameters for transmitting data via said data bus to said host device.

15. A computer readable medium encoded with a computer program comprising program code sections for carrying out the method of claim 13, when said program is run on a host device, a peripheral device having an MMC/SD-interface or a system of host device with an inserted peripheral device having an MMC/SD-interface.

16. A bootable host device configured for being booted from a peripheral device having an MMC/SD-interface, said host device comprising:
- a power supply,
- a processor connected to said power supply, and
- an MMC/SD-interface connected to said processor and to said power supply, said MMC/SD interface with power terminals, a data bus with data bus terminals, a clock line with a clock terminal and a command line with command terminal,
- wherein said host device is configured for providing power to the terminals of said MMC/SD-interface, and setting the command terminal of said MMC/SD-interface during power-up to low, and monitoring the data bus for a start bit of a data transmission.

17. A bootable host device according to claim 16, wherein said processor is configured to send a clock signal from said host device to said data bus terminals of said MMC/SD-interface and to set the command terminal of said MMC/SD-interface during power-up process to low while transmitting between 24 and 148, preferably between 60 and 100 and most preferably 74 initialization clock cycles.

18. A bootable host device according to claim 16, wherein said processor is further configured to send a clock signal from said host device to said data bus terminals of said MMC/SD-interface as long as the MMC/SD device starts to send the first data via said data bus.

19. A bootable host device according to claim 16, wherein said processor is configured to set the data bus terminals to low, to indicate a width for the data bus to be used for the transfer by a peripheral device having an MMC/SD-interface inserted in said MMC/SD-interface.

20. A peripheral device having an MMC/SD-interface configured for booting a bootable host device configured for being booted from a peripheral device having an MMC/SD-interface, said peripheral device comprising:
- an MMC/SD-interface, provided with power terminals, a data bus with data bus terminals, a clock line with a clock terminal and a command line with command terminal,
- a peripheral device controller, connected to said MMC/SD-interface,
- a memory module, connected to said peripheral device controller, and
- wherein said peripheral device controller is configured for sending the first data of a predefined storage area via a data bus, starting with a start bit of the first data frame, when receiving power at the terminals of said MMC/SD-interface of said peripheral device, and a low signal at the command terminal of said MMC/SD-interface during power-up.

21. A peripheral device according to claim 20, wherein said peripheral device controller is further configured to send said first data of a predefined storage area via data bus, only when receiving a low signal at said command terminal of said MMC/SD-interface before or during power-up process during the transmission of between 24 to 148, preferably between 60 and 100 and most preferably to 74 initialization clock cycles.

22. A peripheral device according to claim 20, wherein said peripheral device controller is further configured to:
- receive a low signal at the data bus terminals of said MMC/SD-interface, indicating a width for the data bus to be used for the transfer by, and
- sending said data using the indicated data bus width.

23. A bootable host device configured for being booted from a peripheral device having an MMC/SD interface, said host device comprising:
- a power supply,
- a processor connected to said power supply, and
- an MMC/SD-interface connected to said processor and to said power supply, said MMC/SD-interface having power terminals, a data bus with data bus terminals, a clock line with a clock terminal and a command line with command terminal; and
- wherein said host device is configured for:
  - sending during an initialization process of the peripheral device an argument for a boot request from said host device via said MMC/SD-interface to the peripheral device, and
  - monitoring the data bus for a start bit of a data transmission.

24. A bootable host device according to claim 23, wherein said host device is configured for sending additional arguments via said MMC/SD-interface, said additional arguments indicating parameters related to the boot sequence selected from the group of
- number of data lines to be used for the boot sector read, and
- clock frequency/timing mode to be used, along with said argument for the boot request from said host device to said MMC/SD-interface.

25. A bootable host device according to claim 23, wherein said host device is further configured, to set the data bus terminals of said MMC/SD-interface to low, for indicating a width for the data bus to be used for the transfer.

26. A peripheral device configured for booting a bootable host device configured for being booted from an peripheral device, said peripheral device comprising
- an MMC/SD-interface, comprising power terminals, a data bus with data bus terminals, a clock line with a clock terminal and a command line with command terminal,
- a peripheral device controller, connected to said MMC/SD-interface,
- a memory module, connected to said peripheral device controller, and
- wherein said peripheral device being configured for sending data starting with a start bit of a data transmission via said MMC/SD-interface to said host device, in case boot data are stored in the peripheral device, if and when receiving an argument for a boot request from said host device at said MMC/SD-interface of the peripheral device, and when receiving a clock signal at the clock line.

27. A peripheral device according to claim 26, wherein said peripheral device controller is further configured to receive a low signal at the data bus terminals of said MMC/SD-interface terminal indicating a width for the data bus to be used for the transfer and wherein said peripheral device controller is further configured for using said indicated data bus width for the data bus to be used for the transfer.

28. A peripheral device according to claim 26, wherein said peripheral device controller is further configured to receive along with argument for the boot request from said host device, additional arguments indicating parameters related to the boot sequence selected from the group of
number of data lines to be used for the boot sector read, and
clock frequency/timing mode to be used, and is further configured to send said data via said data bus to said host device according to said indicated parameters.

29. A bootable host device configured for being booted from a peripheral device having an MMC/SD interface, said host device comprising
a power supply,
a processor connected to said power supply, and
an MMC/SD-interface connected to said processor and to said power supply, said MMC/SD-interface having power terminals, a data bus with data bus terminals, a clock line with a clock terminal and a command line with command terminal,
wherein said host device is configured for
starting a standard initialization data exchange of a peripheral device having an MMC/SD interface via said MMC/SD-interface until a stand-by-state of said peripheral device is reached, and
performing a data exchange between said host device and said peripheral device from said stand-by-state for searching for a valid boot code in the components in bus.

30. A bootable host device configured for being booted from a peripheral device having an MMC/SD interface, wherein said peripheral device is provided with an Operation Condition Register with an additional argument for a boot request, said host device comprising
a power supply,
a processor connected to said power supply, and
an MMC/SD-interface connected to said processor and to said power supply, said MMC/SD-interface having power terminals, a data bus with data bus terminals, a clock line with a clock terminal and a command line with command terminal,
wherein said host device is configured for
sending after initialization of a peripheral device having an MMC/SD interface an argument for a boot request to said MMC/SD-interface, and
monitoring the data bus for boot data to be received from said peripheral device via said MMC/SD-interface.

31. A peripheral device having a MMC/SD interface configured for booting a bootable host device configured for being booted from a peripheral device having an MMC/SD interface, wherein said peripheral device is provided in the Operation Condition Register with an additional argument for a boot request said peripheral device comprising
an MMC/SD-interface, comprising power terminals, a data bus with data bus terminals, a clock line with a clock terminal and a command line with command terminal,
a peripheral device controller with a Operation Condition Register, connected to said MMC/SD-interface, and
a memory module, connected to said peripheral device controller,
wherein said peripheral device is provided in the Operation Condition Register with an additional argument for a boot request, and said peripheral device being configured for
receiving after an initialization procedure an argument for a boot request at the peripheral device, and
retrieving and sending boot data from the peripheral device memory module via said MMC/SD-interface to said host device.

32. A peripheral device having an MMC/SD interface according to claim 31, wherein said Operation Condition Register with said argument for a boot request is implemented as a hard coded hardware component, connected to or implemented in said peripheral device controller.

33. A peripheral device having an MMC/SD interface according to claim 31, wherein said Operation Condition Register with said argument for a boot request is implemented as software running in peripheral device controller.

34. A method according to claim 10, wherein said argument for a boot request comprises a command.

35. A method according to claim 10, wherein said argument for a boot request is sent during or directly after the CMD0 phase.

36. A method according to claim 35, wherein said argument for a boot request comprises a reset command during the CMD0 phase.

37. A method according to claim 10, wherein said argument for a boot request comprises an argument for CMD0 command.

38. A method according to claim 10, wherein said argument for a boot request comprises an argument for an amended CMD0 command.

39. A method according to claim 13, wherein said argument for a boot request comprises a command.

40. A method according to claim 13, wherein said argument for a boot request is sent during or directly after the CMD0 phase.

41. A method according to claim 40, wherein said argument for a boot request comprises a reset command during the CMD0 phase.

42. A method according to claim 13, wherein said argument for a boot request comprises an argument for CMD0 command.

43. A method according to claim 13, wherein said argument for a boot request comprises an argument for an amended CMD0 command.

44. A bootable host device according to claim 23, wherein said host device is configured for using an argument for a boot request that comprises a command.

45. A bootable host device according to claim 23, wherein said host device is configured for using an argument for a boot request that is sent during or directly after the CMD0 phase.

46. A bootable host device according to claim 45, wherein said host device is configured for using an argument for a boot request that comprises a reset command sent during the CMD0 phase.

47. A bootable host device according to claim 23, wherein said host device is configured for using an argument for a boot request comprising an argument for CMD0 command.

48. A bootable host device according to claim 23, wherein said host device is configured for using an argument for a boot request comprising an argument for an amended CMD0 command.

49. A peripheral device according to claim 26, wherein said peripheral device controller is further configured to receive an argument for a boot request comprising a command.

50. A peripheral device according to claim 26, wherein said peripheral device controller is further configured to receive an argument for a boot request during or directly after the CMD0 phase.

51. A peripheral device according to claim 50, wherein said peripheral device controller is further configured to receive an argument for a boot request comprising a reset command during the CMD0 phase.

52. A peripheral device according to claim 26, wherein said peripheral device controller is further configured to receive an argument for a boot request comprising an argument for CMD0 command.

53. A peripheral device according to claim 26, wherein said peripheral device controller is further configured to receive an argument for a boot request comprising an argument for an amended CMD0 command.

* * * * *

UNITED STATES PATENT AND TRADEMARK OFFICE
CERTIFICATE OF CORRECTION

| | | |
|---|---|---|
| PATENT NO. | : 7,739,487 B2 | Page 1 of 1 |
| APPLICATION NO. | : 11/333799 | |
| DATED | : June 15, 2010 | |
| INVENTOR(S) | : Mylly et al. | |

It is certified that error appears in the above-identified patent and that said Letters Patent is hereby corrected as shown below:

In the Title:

Title page, Col. 1, line 5: "MAY BOOTED FROM" should read --MAY BE BOOTED FROM--.

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,739,487 B2 |
| APPLICATION NO. | : 11/333799 |
| DATED | : June 15, 2010 |
| INVENTOR(S) | : Mylly et al. |

Page 1 of 1

It is certified that error appears in the above-identified patent and that said Letters Patent is hereby corrected as shown below:

In the Title:

Title page, Item (54) and at Column 1, line 5: "MAY BOOTED FROM" should read --MAY BE BOOTED FROM--.

This certificate supersedes the Certificate of Correction issued August 31, 2010.

Signed and Sealed this

Twenty-eighth Day of September, 2010

David J. Kappos
*Director of the United States Patent and Trademark Office*